US010432799B1

(12) United States Patent
Gharibian

(10) Patent No.: US 10,432,799 B1
(45) Date of Patent: Oct. 1, 2019

(54) RING AND TEXT TONE NOTIFIER (RTTN)

(71) Applicant: Albrik Levick Gharibian, Glendale, CA (US)

(72) Inventor: Albrik Levick Gharibian, Glendale, CA (US)

(*) Notice: Subject to any disclaimer, the term of this patent is extended or adjusted under 35 U.S.C. 154(b) by 0 days.

(21) Appl. No.: 15/967,485

(22) Filed: Apr. 30, 2018

(51) Int. Cl.
  *H04M 19/04* (2006.01)
  *H04M 1/725* (2006.01)
  *H02J 7/00* (2006.01)

(52) U.S. Cl.
  CPC ....... *H04M 19/041* (2013.01); *H04M 1/7253* (2013.01); *H04M 19/047* (2013.01); *H04M 19/048* (2013.01); *H02J 7/0052* (2013.01); *H02J 2007/0059* (2013.01); *H02J 2007/0062* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2004/0264490 A1* | 12/2004 | Sarkkinen | ............ | H04W 76/40 370/432 |
| 2010/0061540 A1* | 3/2010 | Dickens | ................ | H04M 1/575 379/207.16 |
| 2010/0272025 A1* | 10/2010 | Yu | ......................... | H04W 24/02 370/328 |
| 2011/0274093 A1* | 11/2011 | Sing | ...................... | H04W 48/12 370/338 |

* cited by examiner

*Primary Examiner* — Thanh C Le

(57) ABSTRACT

The Ring and Text tones from a mobile device can be missed if the user is located outside the hearing range, away from his/her mobile device. For example, the mobile device is being charged in another room unable to hear the incoming Ring and Text tones. The embodiment of the disclosure in this invention, namely, "Ring and Text Tone Notifier" abbreviated "RTTN" is placed in every room in a house or office by replicating the ring and text tone received from the mobile device, to NOTIFY the user, by sounding and broadcasting the Ring and Text Tones in every room that the RTTN is plugged into some 110-volt wall outlet receptacles. The plugged in RTTN is designed to broadcast an audible as well as displaying any incoming Call and Text with Light Emitted Diodes (LEDs). The RTTN has two prongs adapter that plugs into any standard 110-volt wall outlet receptacles. This eliminates the use of a battery.

4 Claims, 4 Drawing Sheets

Bluetooth connection between "Ring & Text Tone Notifier" (RTTN) and the Mobile device.

"A block diagram of Internal components of Ring and Text Tone Notifier"

(RTTN) 100

Figure 3. The schematic diagram of "Ring and Text Tone Notifier" (RTTN). The three prongs AC outlet "190" is optional and not shown in Figure 3.

RING AND TEXT TONE NOTIFIER (RTTN)

BACKGROUND OF THE INVENTION

The present disclosure relates to a system, title of invention, namely, and Text Tone Notifier" (RTTN) that has been denoted by number 100 in FIG. 1. The RTTN will notify the user of mobile device by broadcasting the Ring and text tone signal received from the mobile device.

BRIEF SUMMARY OF THE INVENTION

The pending disclosure describes embodiments that includes systems, methods and devices used in the RTTN.

In one embodiment of the pending disclosure a user has two mobile devices, one will be the primary default saved mobile device with its distinct selected Ring and Text Tone. The second and additional mobile devices can be detected and added to the RTTN, where each device will be assigned to a different, distinguishable Ring and Text Tone that will NOTIFY the user as they receive a Call or Text, while they are in the standard Bluetooth detectable range of communication. As the mobile devices are outside of the Bluetooth detectable range those mobile devices will not be detected.

Those mobile devices will reconnect as they are again within the Bluetooth detectable range of communication.

The RTTN will be housed in a cubed shape box with a two prongs adapter of standard 110 volt that plugs into any standard wall outlet in any room. This has been shown with (100) in all the Figures. The two prongs adapter is identified as (180) in the FIG. 2. This 110 Volt of the AC from the wall outlet will be the input voltage to the RTTN's AC-DC Converter, where it will be converted into a 5 Volt Direct Voltage. The RTTN will include an internal circuitry comprised of Alternating Current (AC) to Direct Current (DC) converter known as "AC to DC Converter".

The output voltage from the AC-DC Converter will be set to 5 Volts of Direct Voltage. This AC-DC Converter is denoted by (120) in FIG. 2. The 5 Volt DC from the RTTN's AC to DC converter supplies the DC voltages necessary for the components used in the RTTN. These components are the "Bluetooth main Board" indicated with (130), Red LED (140), Green LED (150), USB Port (160) Speaker (170), Piezo Buzzer with a built-in amplifier denoted by (110), an On-Off switch (195) and an extra three prongs adapter denoted by (190) in the FIG. 2.

BRIEF DESCRIPTION OF DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION OF THE INVENTION

Figure 1:
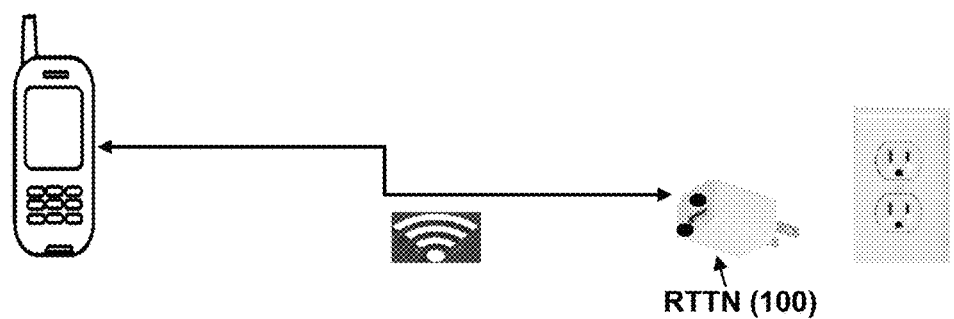
FIG. 1 is a diagram of the Bluetooth connection between a mobile device and the "Ring and Text Tone Notifier" RTTN (100).

Embodiment of the disclosure includes a system, title of invention, namely, and Text Tone Notifier" (RTTN) that has been denoted by number 100 in FIG. 1.

The RTTN will Notify the user of mobile device by broadcasting the Ring and text tone signal received from the mobile device that is located in another room outside the normal hearing range.

Figure 2:
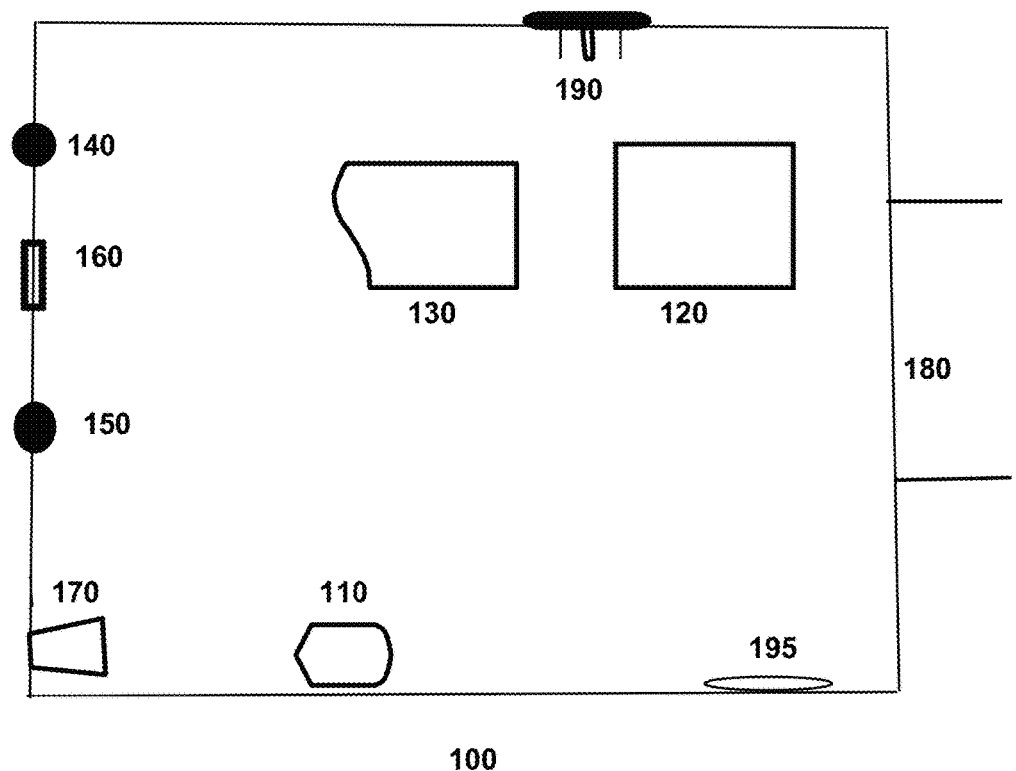
FIG. 2 is a block diagram of an exemplary system for the invention "Ring and Text Tone Notifier" abbreviated RTTN.

FIG. 2, is a block diagram of an exemplary system for the components specifically used inside the RTTN denoted by 100.

The RTTN device will broadcast audible Notification alerts when it is linked or paired to a mobile device (i.e. cell phone) is receiving a call or a text message.

The title "Notifier" stands for the NOTIFICATION or emulation of the Ring and Text Tone that is broadcast by the RTTN, hence the title NOTIFIER. The audible alert can be set to emulate the incoming ring and text tones from the paired mobile device that is located a distance (limited by Bluetooth technology) away from the RTTN device in a home or office.

The RTTN can be plugged into standard 110 Volts receptacles in any room or office to broadcast an audible as well as display with Light Emitted Diodes (LEDs) any incoming Call or a Text message that is outside the hearing range.

When the Ring and Text Tone of mobile devices are outside of the hearing range, will result to a missed call and text in a house or office. The RTTN resolves the problem of missed calls or text messages that is outside the hearing range.

The main use of RTTN is to prevent the loss of any miss Call or Text as a result of the audible Ring and Text tone being outside the hearing range.

Therefore, by having the RTTN plugged in as many rooms in a house or Office will Notify the user's incoming Ring and Text Tones.

The RTTN will have a default detected Bluetooth connection with the primary mobile device. (This is one of my Claims).

The RTTN will detect multiple mobile devices via Bluetooth connection with different Ring and Text Tones. (This is another set of my Claims).

FIG. 1 is a diagram of the Bluetooth connection between a mobile device and the "Ring and Text Tone Notifier" RTTN (100).

The RTTN denoted by 100 plugs into any standard 110-volt power wall outlet (shown in FIG. 1).

The RTTN can be plugged in 110 wall outlets in one or more than one room is house or Office, where the user mobile device can be left charged in one room and in order not to miss a call or a Text by being away in another room due to being able to hear the incoming call or a text.

As the RTTN is plugged in to the wall outlet of AC 110 volt the Green LED lights up indicating the RTTN is ready to pair via Bluetooth with any mobile device that is at a detectable range.

Figure 3:
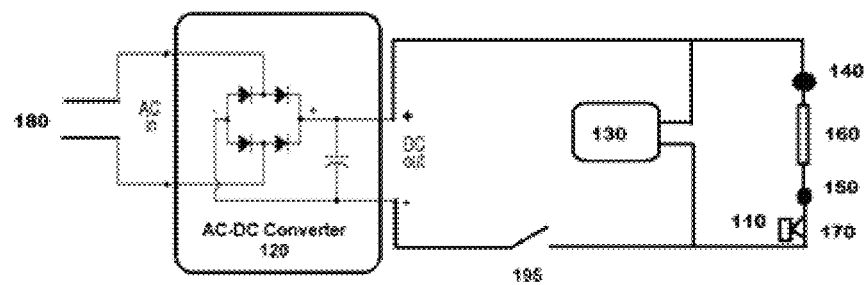
FIG. 3 is a schematic diagram of the "Ring and Text Tone Notifier" RTTN denoted by (100) in FIGS. 1, 2 and 3.

FIG. 2 is a block diagram of an exemplary system for the invention "Ring and Text Tone Notifier" abbreviated RTTN that may include but not limited to the following components with specific functions described below:

(i) Two prongs adapter for plugging into any standard 110-volt power outlet, shown in FIG. 2 and FIG. 3 as (180);

(ii) An on/off power switch to turn the RTTN on/off, indicated by (195) in FIGS. 2 and 3;

(iii) Bluetooth search capabilities Module denoted by (130) that includes a Bluetooth processor (CPU) to identify one or more than one available mobile device that is ready to pair with the RTTN;

(iv) A touch screen display to allow the user to select the detected devices to pair with; to select an audible tone, or ring, and a volume control, not shown in any of the Figures;

(v) Red denoted by (140) and Green (150) LEDs to distinguish between an incoming phone call vs text message. The Green LED also turns solid green light as the RTTN is plugged into 110 Volts outlet indicating the "Ready" state of the RTTN;

(vi) A USB port input for the purpose of providing a means for a mobile device to recharge, or data transfer, indicated by (160);

(vii) An AC-DC Converter, (120);

(viii) A speaker, (170) with a Piezo buzzer with a built-in amplified circuit (110) to broadcast the selected tone or ring;

(ix) A 3-prong grounded outlet adaptor, indicated by (190).

FIG. 3 is a schematic diagram of the "Ring and Text Tone Notifier" RTTN denoted by (100) in FIGS. 1, 2 and 3.

FIG. 3. is an exemplary schematic diagram of the internal components that are inside a cubed box with its two prongs adapter depicted in FIG. 1. The components inside the cubed box are: The schematic diagram of the AC to DC converter indicated by (120) in FIG. 3. The input voltage to this AC-Dc converter is a 110-Volt AC (Plugged in to the wall outlet), where the output voltage from AC-DC converter will be set to 5-volt. The 5-volt from the output of the Ac-Dc converter will supply power to all the rest of the components, including but not limited to the Bluetooth main Board (130), the two Red (140) and Green (150) LEDs, the USB port (160), the speaker (170) and the Piezo Buzzer with a built-in amplifier (110).

The extra three prongs adapter (190) not shown in FIG. 3 will get the 110-volt AC by directly connected to the two prongs adapter with proper grounding of the (190). The switch (195) will be to turn the RTTN off and on as it is plugged into the 110-volt of wall outlet receptacles.

Figure 4:
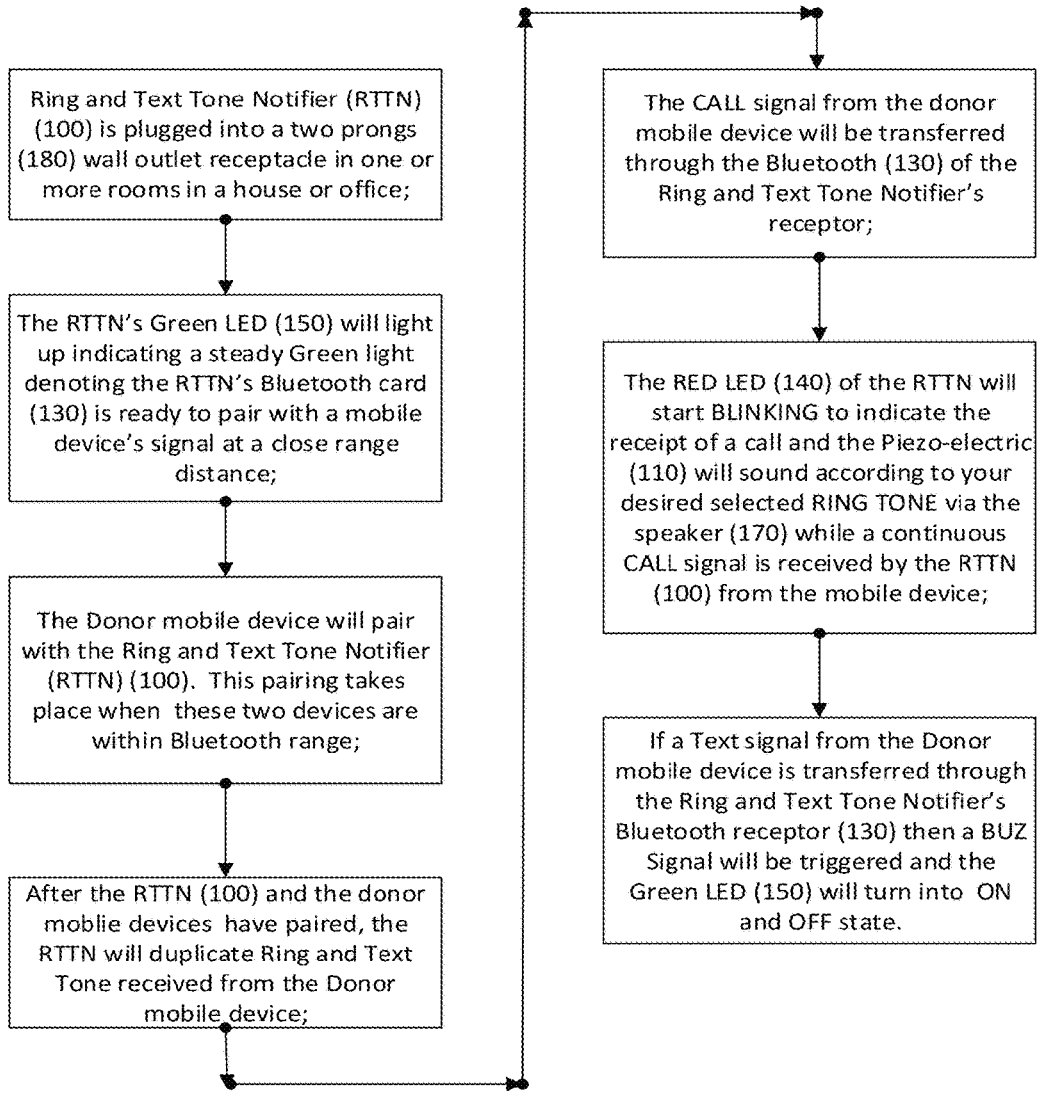
FIG. 4 is a flowchart illustrating an example method for the RTTN from the step one as it is plugged into a 110-volt wall outlet receptacle.

FIG. 4 is a flowchart illustrating an example method for the RTTN from the step one as it is plugged into a 110-volt wall outlet receptacle, where the Green LED indicates the "Ready" state of the RTTN by pairing with the user mobile device at the Bluetooth communication required distance.

As the user receives a Call or a Text the RTTN will emulate the mobile devices signal and NOTIFY the Call or the Text via the speaker of the RTTN. If he user is in another room unable to hear the mobile device's Call or the Text Tone then the RTTN will sound the Ring and the Text tone as well as by indicating the Call and the Text by the two Red and Green LEDs. This is the primary purpose of the RTTN to inform the user in case the mobile device is left or being charged in another room.

In order NOT to miss out any incoming mobile device's call or a text tone (even when the mobile device is on vibrate mode) the RTTN NOTIFIES alerts, or duplicates the call and text tones.

The RTTN Notification allows NOT to miss out any incoming call or text message that may be missed, when a mobile device is outside the normal hearing range. Hence the title Notifier had been adopted.

For example, a mobile device is being charged away in any room away, sometimes for safety reason and the user is busy in another room outside the hearing range of the mobile device's ring and text tone.

The RTTN has been invented primarily for when it is not possible to hear your mobile device's ring and text tones, therefore, by Notifying and Indicating by the RED and Green LEDs the UNHEARD missing tones from the mobile device. The RTTN is a means of alerting the user even if the mobile device is set to vibrate mode.

The RTTN device receives the Bluetooth wireless input signal from the mobile device and broadcasts an audible alert as well as displays a Red Light Emitted Diode (LED) to indicate a phone call or a Green Light Emitted Diode (LED) to indicate an incoming Text message.

The primary benefit of the RTTN device is to allow a user to be in a different location outside of hearing range of their mobile device, and still be alerted both audibly and visually (LED indicator) when the mobile device is receiving a call or text message, thereby not missing an important call or text. The RTTN is plugged in to a 110-volt standard wall outlet. The solid green LED lights up indicating it is ready to pair with the nearest mobile device(s).

This pairing of the RTTN and the mobile device take place with the current Bluetooth technology. The RTTN uses a low Direct voltage being supplied by the AC to Dc converter, where the input is 110-volt AC and the Output is a 5-volt Direct voltage obtained from the AC-DC converter.

This 5-volt supplies power to the internal components of the RTTN, comprising of a rechargeable battery (not shown) in the figures above. This battery is used in case of a power outage and it is part of the AC-DC converter. The RTTN has the Bluetooth main Board and the speaker with the Piezo Buzzer with a built-in amplifier to amplify the input signal received from the mobile device, hence Notify the amplified Ring and Text tone, via the speaker. The USB port is just an addition to the RTTN to serve as a charging device for a mobile or any other suitable device. There is an On-Off switch to turn the RTTN off and on as desired. An extra three prongs grounded adapter is housed on the RTTN. This is to compensate for the wall outlet receptacles that has been taken by plugging in the RTTN.

What is claimed is:

1. A system of notification of a Call and Text by the "Ring and Text Tone Notifier" to emulate by duplicating the ring and text tone received from a mobile device comprising;

a two prongs adapter for plugging into any standard 110-volt power outlet;

an on/off power switch to turn the RTTN on/off;

Bluetooth search capabilities module denoted by (130) that includes a Bluetooth processor (CPU) to identify one or more than one available mobile device that are ready to pair with the RTTN;

a touch screen display to allow the user to select the detected devices to pair with;

to select an audible tone, or ring, and a volume control;

red LED and Green LED to distinguish between an incoming phone call vs text message; the Green LED also turns solid green light as the RTTN is plugged into 110 Volts outlet indicating the "Ready" state of the RTTN;

a USB port input for the purpose of providing a means for the mobile device to recharge, or data transfer;

an AC-DC Converter;

a speaker with a Piezo buzzer with a built-in amplified circuit to broadcast the selected tone or ring;

the RTTN may contain an extra 3-prong grounded outlet adaptor in order to compensate for the one already taken by plugging in the RTTN.

2. The system of claim 1, further comprising the NOTIFICATION of broadcasting the Ring and Text signal for the mobile device owner to NOT MISS OUT any incoming call and Text that is outside the normal hearing range, by having the mobile device in a room or office away from the user;
  this Notification created by the RTTN, comprising;
    the RTTN's Ready state is indicated by the Green LED after the RTTN is plugged in the wall outlet;
    the RTTN will pair with the mobile device as they are within the detectable Bluetooth range of communication;
    a Bluetooth Board that allows to pair more than one mobile device at a time;
    the Bluetooth receptor of the "Ring and Text Tone Notifier" (RTTN), receives the signal from the mobile device;
    the RTTN amplifies the Ring and text tone received from the mobile device and NOTIFY the user with its own set of preset Tone and Text tones, until the user answers the incoming call or the Text;
    the RTTN will not broadcast the conversation by the mobile device user and the RTTN will be in the Ready state again by displaying the solid light on by the Green LED.

3. The system of claim 2, further comprising configuring two prongs adapter that plugs in the "Ring and Text Tone Notifier" (RTTN) device in the wall outlet receptacles, which eliminates the use of a battery;
  wherein the RTTN is independent of the use of a battery;
    the AC-DC converter has a built-in chargeable battery, that is bundled within the AC-DC converter circuitry;
    this chargeable battery is for when there is power outage the RTTN will be useable and the internal charged battery provides Notification of calls and text messages, while there is power outage for about an hour.

4. The system of claim 1, further comprising configuring two prongs adapter that plugs in the "Ring and Text Tone Notifier" (RTTN) device in the wall outlet receptacles, which eliminates the use of a battery;
  wherein the RTTN is independent of the use of a battery;
    the AC-DC converter has a built-in chargeable battery, that is bundled within the AC-DC converter circuitry;
    this chargeable battery is for when there is power outage the RTTN will be useable and the internal charged battery provides Notification of calls and text messages, while there is power outage for about an hour.

* * * * *